United States Patent
Lesartre et al.

(10) Patent No.: US 11,943,149 B2
(45) Date of Patent: Mar. 26, 2024

(54) ARBITER WITH RANDOM TIE BREAKING

(71) Applicant: Hewlett Packard Enterprise Development LP, Houston, TX (US)

(72) Inventors: Gregg B. Lesartre, Fort Collins, CO (US); Darel Neal Emmot, Wellington, CO (US); James D. Gibson, Loveland, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 760 days.

(21) Appl. No.: 16/949,148

(22) Filed: Oct. 15, 2020

(65) Prior Publication Data

US 2021/0112015 A1 Apr. 15, 2021

Related U.S. Application Data

(60) Provisional application No. 62/915,396, filed on Oct. 15, 2019.

(51) Int. Cl.
| | |
|---|---|
| *H04L 47/62* | (2022.01) |
| *H04L 12/44* | (2006.01) |
| *H04L 45/00* | (2022.01) |
| *H04L 45/122* | (2022.01) |
| *H04L 45/48* | (2022.01) |
| *H04L 47/6275* | (2022.01) |
| *H04L 49/253* | (2022.01) |

(52) U.S. Cl.
CPC ............ *H04L 47/623* (2013.01); *H04L 12/44* (2013.01); *H04L 45/122* (2013.01); *H04L 45/20* (2013.01); *H04L 45/48* (2013.01); *H04L 47/6275* (2013.01); *H04L 49/254* (2013.01)

(58) Field of Classification Search
CPC ...... H04L 47/623; H04L 12/44; H04L 45/122; H04L 45/20; H04L 45/48; H04L 47/6275; H04L 49/254; H04L 47/11; H04L 47/50
See application file for complete search history.

(56) References Cited

U.S. PATENT DOCUMENTS

| | | | |
|---|---|---|---|
| 7,089,324 B1* | 8/2006 | Milius | H04L 12/5692 709/239 |
| 7,391,732 B1 | 6/2008 | Cortez et al. | |
| 7,685,346 B2 | 3/2010 | Teh et al. | |
| 10,708,127 B1* | 7/2020 | Acharya | H04L 49/254 |
| 2004/0090974 A1* | 5/2004 | Balakrishnan | H04L 49/254 370/412 |

(Continued)

OTHER PUBLICATIONS

Kim et al., "Low-Overhead Network-on-Chip Support for Location-Oblivious Task Placement," IEEE Transactions on Computers, vol. 63, No. 6, Jun. 9, 2014, pp. 1486-1499.

(Continued)

*Primary Examiner* — Abdulkader M Alriyashi
(74) *Attorney, Agent, or Firm* — Yao Legal Services, Inc.

(57) ABSTRACT

Candidates for selection in a weighted arbitration system are assigned priority weights and random weights. The winning candidate is determined using a tree of selectors such as a comparators. At each stage of the tree, the candidate having the greatest priority weight is selected to pass to the next stage. If multiple candidates are tied for the greatest priority weight, the candidate having the greatest random weight is selected to pass to the next stage.

17 Claims, 3 Drawing Sheets

(56) References Cited

U.S. PATENT DOCUMENTS

2012/0182872 A1* 7/2012 Wakumoto ............ H04L 45/245
 370/312
2017/0185312 A1 6/2017 Smith et al.

OTHER PUBLICATIONS

Xu et al., "Design and implementation of a dynamic weight arbiter for networks-on-chip," 2014 4th IEEE International Conference on Information Science and Technology, Apr. 26-28, 2014, pp. 354-357.

* cited by examiner

ARBITER WITH RANDOM TIE BREAKING

STATEMENT OF GOVERNMENT RIGHTS

This invention was made with Government support under Prime Contract No. DE-AC52-07NA27344 awarded by DOE. The Government has certain rights in this invention.

BACKGROUND

Weighted arbitration may be used in a computer fabric to select routes or to select a next transaction to send based on biases intended to improve overall system behavior. For instance, an arbiter may select older transactions over newer ones to send. A route selection arbiter may select a fabric route based on distance to the destination, but may select a longer path based on congestion information indicating that the shorter path is overloaded. This selection may be done based comparison of the merit for each possible selection (transaction age or destination distance on a selected path combined with path congestion information in these examples).

BRIEF DESCRIPTION OF THE DRAWINGS

Certain examples are described in the following detailed description and in reference to the drawings, in which.

DETAILED DESCRIPTION OF SPECIFIC EXAMPLES

In many cases when the arbiter is active multiple options may have equal priorities. When this is the case it is important that the arbiter select evenly from the equal options. If an arbiter has multiple route options, but has a bias to select one or more particular paths, then fabric traffic will experience greater congestion resulting in longer transaction latencies to cross the fabric. If an arbiter is biased toward selecting equal age transactions from one source over others, then fabric latencies will become unequal based on the source of the transactions.

Implementations of the disclosed technology provide a tree-based arbiter that provides fair, randomized tie-breaking when candidates under arbitration have equal prioritizations.

Figure 1:
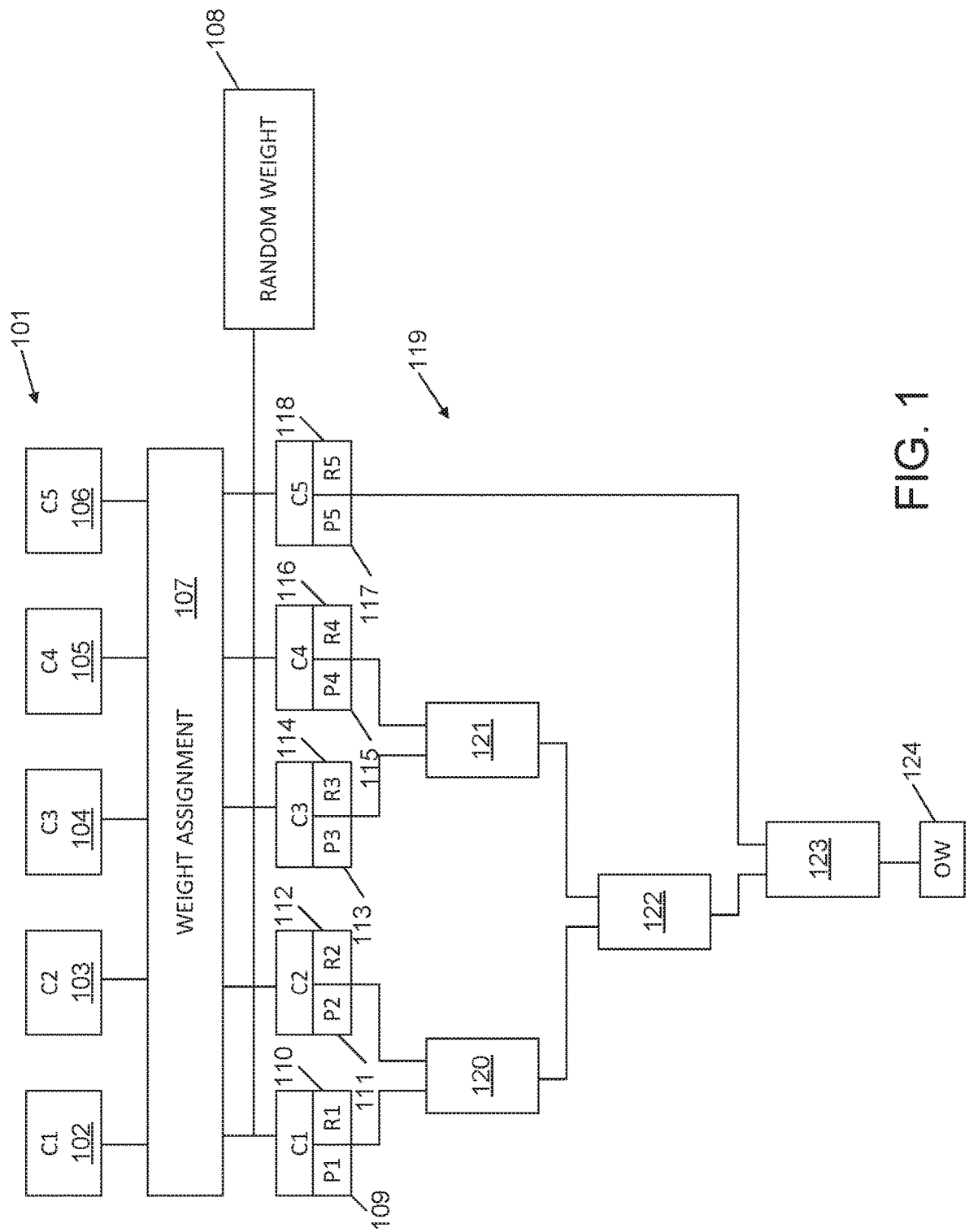
FIG. 1 illustrates an example device including an arbitration system providing randomized and balanced tie-breaking.

FIG. 1 illustrates an example device including an arbitration system providing randomized and balanced tie-breaking. In various implementations, the illustrated device may be implemented as hardware, as software stored on a non-transitory computer readable medium, or as a combination thereof. The device determines an overall winning candidate 124 for resource allocation from amongst a plurality of competing candidates 101. The illustrated device may be implemented in various manners to provide arbitration for various resource types. For example, the illustrated device may be a route arbiter. In this example, a fabric may have multiple allowed routes for a packet to take to reach its destination and the candidates 101 may comprise those allowed routes for a packet to be transmitted. As another example, the illustrated device may be a packet arbiter. For instance, the device may be an arbiter to select amongst a plurality of packets 101 for transmission on a particular egress port of a network device.

The device includes a priority weighting system 107. The priority weighting system 107 assigns a corresponding priority weight 109, 111, 113, 115, 117 to each candidate 102, 103, 104, 105, 106, respectively. The priority weighting system 107 assigns the priority weights based on a metric determined according an arbitration technique. For example, a packet arbiter may apply age-based arbitration, where the priority weighting system 107 may assign priority values to the candidates 102-106 based on their age such that older packets receive higher priority values. For example, the priority weighting system 107 may assign the priority weights based on the values of time-to-live (TTL) packet fields. As another example, the priority weighting system 107 may assign priority values to candidate routes based on total route hop counts, route congestion, time since a particular route or egress port has been used, or other factors.

The device further includes a random weighting system 108. The random weighting system 108 assigns an uncorrelated random weight 110, 112, 114, 116, 118 to each candidate 102, 103, 104, 105, 106, respectively. In some implementations, the random weighting system 108 may use a pseudorandom/statistically random number generator to generate the random weights. For example, the random weighting system 108 may comprise a linear feedback shift register (LFSR) configured to generate a pseudorandom bit stream. In other implementations, the random weighting system 108 may use a true random number generator to generate the random weights. For example, the random weighting system 108 may comprise a hardware random number generator based on the binary sampling of noise signals, such as thermal noise.

In some implementations, the random weighting system 108 may assign all of its random weights according to a uniform distribution. For example, if the random weights are each 4 bits long (i.e., decimals between 0 and 15), the weights may be randomly drawn uniformly between 0000 and 1111. In other implementations, the random weighting system 108 uses different distributions for different candidates. This may enable the arbitration system to preferentially select preferred candidates while retaining a balanced distribution of overall winning candidates. For example, the random weighting system 108 may use a first distribution for candidate routes having a first bandwidth and a second distribution for candidate routes of having a second bandwidth class. As an example, with 4 bit random weights and two routes, with a first route having twice the bandwidth of the second route, the random weighting system 108 might draw randomly from between 0000 and 1111 for the first route and from between 0000 and 0111 for the second route. (For example, the random weighting system may perform a single bit right shift for the random weight assigned to the second route.)

In some implementations, the priority weights 109, 111, 113, 115, 117 and the random weights 110, 112, 114, 116, 118 are combined into a single overall weight for each candidate. For example, the priority weight may be the most significant digits of the overall weight and the random weight may be the least significant digits of the overall weight. For example, the overall weights may be formed by concatenating the outputs of the random weighting system 108 to the outputs of priority weighting system 107. In one example, the priority weights 109, 111, 113, 115, 117 and the random weights 110, 112, 114, 116, 118 are binary numbers and the length of the random weights are at least $\log_2(x)$ where x is the total number of leaf nodes of the tree 119. For example, in a system with up to 16 possible candidates, the random weights 110, 112, 114, 116, 118 are at least 4 bits long.

The device further comprises a tree 119 of selectors 120-123. Each selector receives a plurality of inputs corresponding to candidates to be evaluated and outputs a winning candidate of its evaluated candidates. The lowest level selector 123 outputs the overall winning candidate 124. Each selector compares the input weights of the candidates it evaluates. If a single evaluated candidate has a greatest priority weight 109, 111, 113, 115, 117, then the selector selects that evaluated candidate as its winning candidate. If at least two evaluated candidates are tied for the greatest priority weight, the selector selects the evaluated candidate of the tied candidates that a greatest random weight as its winning candidate. In various implementations, different techniques may be employed if multiple evaluated candidates are tied for greatest priority and random weight. For example, each selector may randomly select one of the tied candidates as its winning candidate.

In the illustrated example, each candidate 102-106 has a combined weight comprising its priority weight 109, 111, 113, 115, 117 as the most significant digits and its random weight 110, 112, 114, 116, 118 as the least significant digits. The tree 119 is a binary tree with each selector 120-123 comprising a digital comparator. The use of the random weights that carry through the entire tree provide a fair selection of equally prioritized candidates regardless of how the candidates are spread amongst the tree's 119 inputs.

For example, consider the case where the three candidates C1, C3, and C5 are routinely tied for the greatest priority weight (e.g., 11111b in a 5 bit weighted arbitration system).

In a system where each comparator simply randomly selected a winner between two tied candidates, C1 and C3 would each win 25% of the time while C5 would win 50% of the time. This is because C1 would win 50% of the time at stage 122, C2 would win 50% of the time at stage 122. The winner of stage 122 would then be evaluated at stage 123 against C5. At stage 123 the winner of stage 122 would win 50% of the time (i.e. C1 wins 25% of the time and C3 wins 25% of the time) and C5 would win 50% of the time.

Continuing the example, in the illustrated device, each of the candidates 102-106 is assigned a random weight at the input stage that is carried through the entire tree 119. If C1, C3, and C5 are all tied for the highest priority weight, the candidate assigned the highest random weight will eventually be the overall winner 124. Accordingly, each of the three candidates will win approximately ⅓ of the time, where the total number of bits of the random weights determines how close to a completely fair selection occurs (i.e., how infrequently an independent random tie breaker occurs at each comparator stage).

Figure 2:
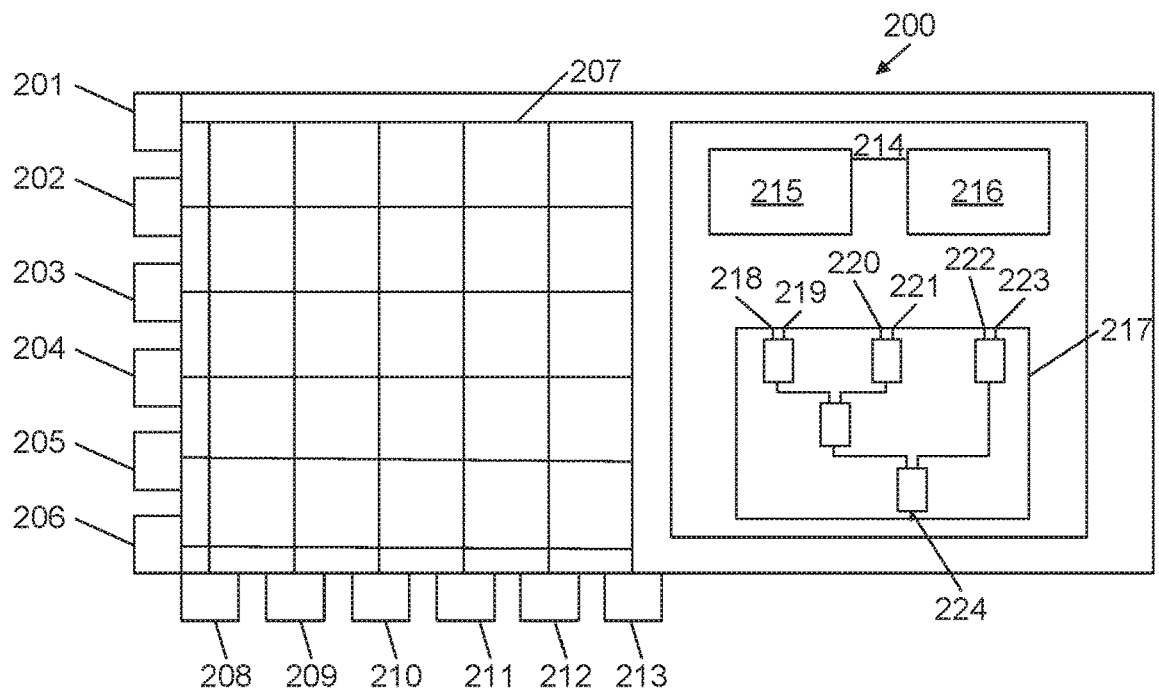
FIG. 2 illustrates an example device as an implementation of a device according to FIG. 1.

FIG. 2 illustrates an example device 200 as an implementation of a device according to FIG. 1. Example device 200 is a network switch 200 including a fair weighted arbiter 217 for route selection. The switch 200 comprises a plurality of input ports 201, 202, 203, 204, 205, 206 and a plurality of output ports 208, 209, 210, 211, 212, 213. In the illustrated example, the inputs ports are output ports are connected by a crossbar 207. Other examples, may use any of a variety of different switch architectures. A network controller 214 controls the coupling of the input ports to output ports to route a packet received on one of the input ports 201, 202, 203, 204, 205, 206 to one of the output ports 208, 209, 210, 211, 212, 213.

In this example, the switch 200 employs adaptive routing on received packets. When a packet is received via an input port, the controller 214 determines candidate egress ports for the packet corresponding to the packet's candidate routes. The controller 214 includes a priority weighting system 215 that includes a routing table that defines the potential routes for different destinations. The priority weighting system 215 provides a weight for each candidate route. The weight may be based on static conditions, such as number of network hops on the candidate route, the total bandwidth on the route, whether the route is dedicated for packets having a particular trait (such as packet type, traffic class), or other static factors. The weight may also be based on dynamic conditions, such as network congestion on each candidate route, or the historical use of the route (for example, to allow load balancing over routes).

The switch controller 216 further comprises a random weighting system 216 to generate a random weight for each of the candidate routes. For example, the source 216 may concatenate a string of random bits to the priority weight bits generated by the weighting system 215. The resulting combined weights are then input to the arbiter 217 for determining an overall winning route.

In one example, the arbiter 217 comprises an input 218, 219, 220, 221 222, 223 for each of the egress ports 208, 209, 210, 211, 212, 213. The weights for the ports corresponding to the candidate routes are input to the corresponding input. For example, if a received packet has 3 potential routes over egress ports 201, 203, 206, then the weights for those routes are input on inputs 218, 220, 223, respectively. The other inputs 219, 221, 222 may have null inputs.

In another example, the inputs 218-223 are not tied to particular egress ports and controller 214 inputs the candidate weights in an arbitrary order. For example, if a received packet has 3 potential routes over egress ports 201, 203, 206, then the weights for those routes may be input on inputs 218, 219, 220, respectively, and the remaining inputs are null.

The winning route is output on output 224. In response, the controller 214 routes the packet from the received ingress port to the winning egress port using the cross bar 207. For example, the controller 214 may place the packet in an output queue for the winning egress port for future transmission.

Figure 3:
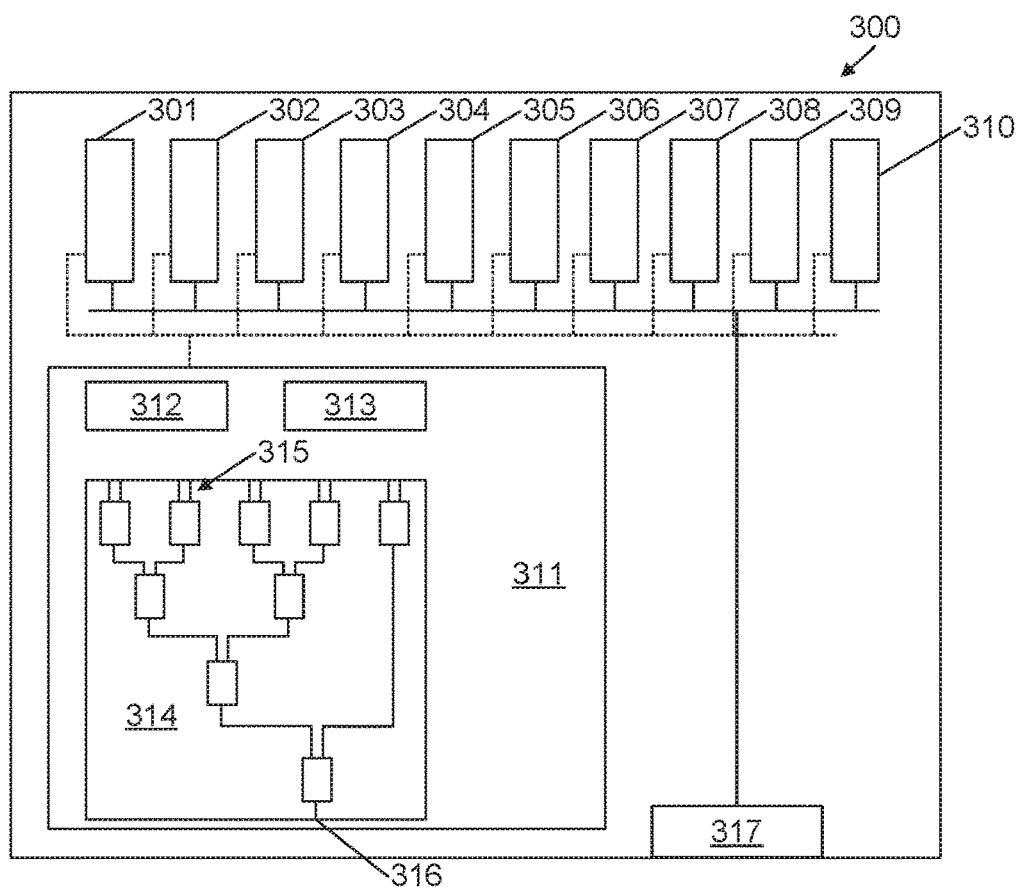
FIG. 3 illustrates an example device as an implementation of a device described according to FIG. 1.

FIG. 3 illustrates an example device 300 as an implementation of a device described according to FIG. 1. In this example, the network device 300 includes a controller 311 to select a packet from one of a plurality of queues 301, 302, 303, 304, 305, 306, 307, 308, 309, 310 for transmission over an egress port 317. For example, the plurality of queues may comprise queues corresponding to different packet traffic classes. The number of potential candidate packets for transmission over the egress port 317 depends on the number of queues and how packets may be drawn from queues. As an example, if packets may be selected only from the head of a queue, then each queue with a head of queue packet has a candidate for transmission over the egress port 317. As another example, if a packet may be selected from anywhere in a queue, then each packet in any queue is a candidate for transmission over the egress port 317. In some examples, the potential queues may be limited to a subset of the queues 301-310. For example, the network may employ credit based flow control with different amounts of credits for different queues. In this example, the queues providing potential packets may be limited to those queues having sufficient credits.

The controller 311 includes a weighting system 312 to assign a priority weight to each candidate packet. The priority weights may be assigned based on various factors. For example, in an age-based arbitration system, the candidate packets may be weighted based on the value of their time-to-live (TTL) fields (where a packet with less time to live is given a higher priority than a packet with more time to live). As a further example, the age-based weights may be combined with priority values for different queues 301-310 to generate a combined prioritization. In other implementations employing different arbitration techniques further packet characteristics may be employed in determining the priority weights. For example, such additional characteristics may include: historical information such as when the packet's queue was last selected, when the packet's source was last selected, or when the packet's destination was last selected; or congestion information, such as congestion along each candidate packet's potential route to its destination.

The switch controller 311 further comprises a random weighting system 313 to generate a random weight for each of the candidate packets. For example, the source 313 may concatenate a string of random bits to the priority weight bits generated by the weighting system 312. The resulting combined weights are then input to the tree 314 for determining an overall winning packet for transmission on the egress port 317. In the illustrated example, the tree 314 includes one input 315 for each queue 301-310 because a packet may only be retrieved from the head of queue. In an examples where other packets may be retrieved from a queue, the tree 314 may include an input 315 for the maximum possible number of packets that may be evaluated in a given candidate selection cycle.

Figure 4:
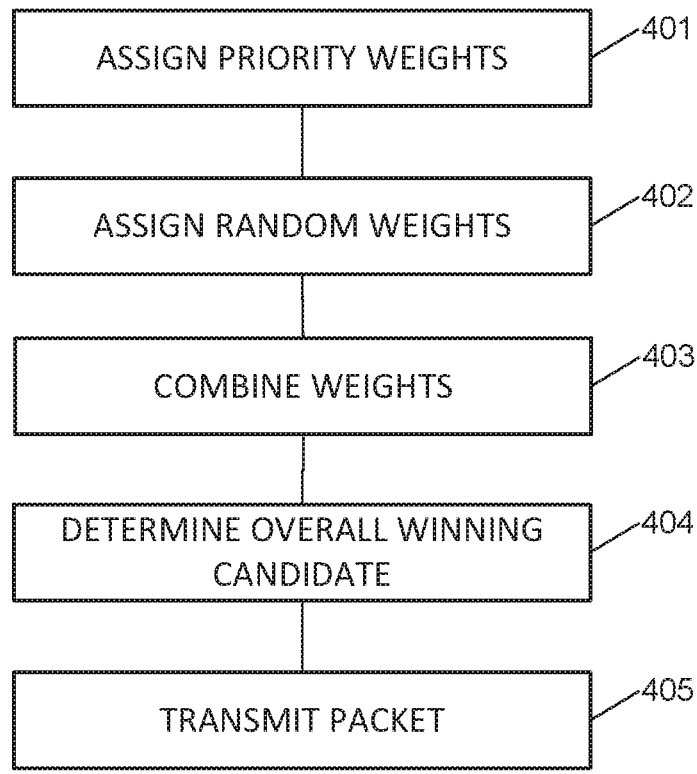
FIG. 4 illustrates an example method of operation of a device implemented as described with respect to FIG. 1.

FIG. 4 illustrates an example method of operation of a device implemented as described with respect to FIG. 1.

The method includes block 401. Block 401 includes assigning each of a plurality of arbitration candidates a corresponding priority weight. As described above, the candidates may be any resource selected through a weighted arbitration technique. For example, the candidates may be candidate packets for transmission or candidate routes for transmitting a packet. The priority weights may be assigned based on a prioritization of the candidates under evaluation according to a variety of weighted arbitration schemes as discussed above with regards to FIGS. 1-3.

The method further includes block 402. Block 402 includes assigning each of the plurality of candidates a corresponding random weight. For example, the random weights may be generated and assigned as described above with respect to FIGS. 1-3. In various implementations, the random weights may be generating using a deterministic random number generator such as an LFSR or a non-deterministic random number generator (for example, based on sampling of some noise signal such as thermal noise). In some implementations, the random weights may be assigned using different random number distributions for different candidates.

The method further includes block 403. Block 403 includes, for each candidate of the plurality, combining the candidate's corresponding priority weight and the candidate's corresponding random weight to generate a corresponding overall weight for the candidate. For example, block 403 may be performed by concatenating the priority weight and the random weight such that the priority weight occurs at most significant digits of the overall weight and the random weight occurs at least significant digits of the overall weight.

The method further includes block 404. Block 404 includes determining an overall winning candidate from the plurality of candidates. As described above, the overall winning candidate may be determined using a tree of selectors, such as a binary tree of comparators. Each comparator in the binary tree compares a pair of candidates and selects a winning candidate based on a comparison of the overall weights of each of the pair of candidates. The comparison is performed such that a candidate having the greatest priority weight is the winning candidates. If each of the pair has equal priorities, then the candidate with the greatest random weight is selected as the winning candidate. Different implementations may handle ties of both the priority and random weights differently. For example, each comparator may select the winning candidate randomly if the overall weights of each of the pair of candidates are equal.

Figure 5:
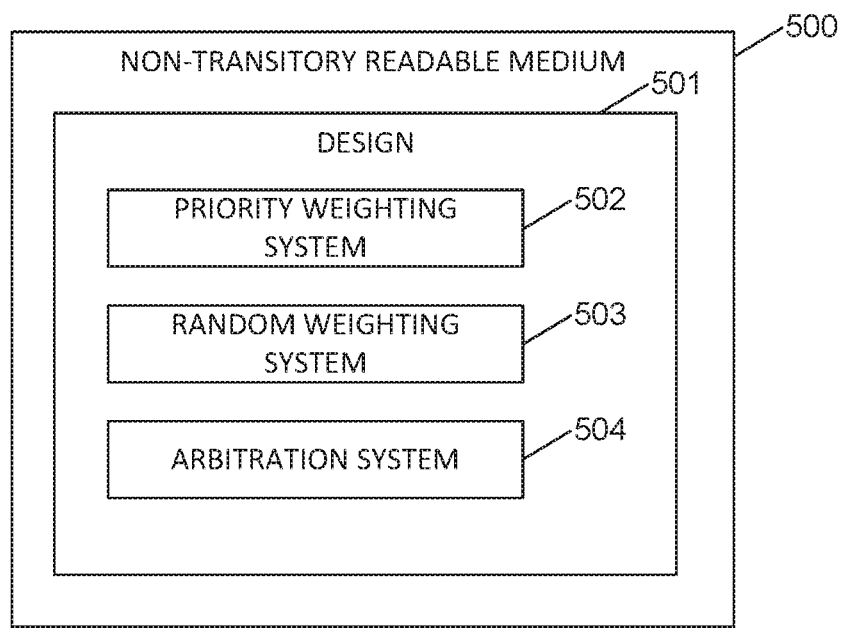
FIG. 5 illustrates an example non-transitory computer readable medium storing a design for a hardware implementation for a device as described with respect to FIGS. 1-3.

FIG. 5 illustrates an example non-transitory computer readable medium 500 storing a design for a hardware implementation for a device as described with respect to FIGS. 1-3. For example, the medium 500 may comprise computer storage or memory, or a portable computer readable storage. The design 501 may be for a portion or block of an integrated circuit (IC), an IC in its entirety, or a device comprise multiple ICs. The design 501 may be stored in various formats. For example, the design 501 may comprise a synthesizable register transfer level (RTL) block design, gate-level netlist, or a transistor layout.

The overall designs may include designs for any of the implementations discussed above. In one implementation, the design 501 for the device includes a design 502 for a priority weighting system to assign each of a plurality of candidates a corresponding priority weight. For example, the design 501 may be for a network device and the candidates may be for network device resources that are allocated based on a weighted arbitration scheme, such as packets to be selected for transmission or routes to be used for a packet.

In this implementation, the design 501 includes a design 503 for a random weighting system to assign each of the plurality of candidates a corresponding random weight. For example, the random weighting system may be designed to assign a random weight to the candidates by concatenating random bits to each candidates' priority weight such that corresponding priority weight are the most significant digits and each corresponding random weight are the least significant digits of a corresponding overall weight assigned to each of the plurality of candidates.

The design 501 further includes a design 504 for an arbitration system to select an overall winning candidate, the arbitration system comprising a tree of selectors. Each selector evaluates a plurality of candidates and selects a winning candidate based on the candidate weights. The evaluated candidates may be winning candidates output by earlier selectors in the tree, original inputs to the tree, or a combination thereof, depending on the selector's location in the tree. As discussed above, if a single evaluated candidate has greatest priority weight, then the selector selects the single evaluated candidate as the winning candidate. If more than one of the candidates are tied for the greatest priority weight, then the selector selects the candidate having the greatest random weight as the winning candidate. In one example, the selectors are binary comparators that compare the concatenated overall weights of the candidates and select the evaluated candidate having the greatest overall weight.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A networking device, comprising:
a plurality of hardware resource components comprising communication ports and packet queues; and
an arbiter circuit to:
assign a respective candidate of a plurality of candidates a corresponding priority weight;
the respective candidate a corresponding random weight;
generate an overall weight for the respective candidate by concatenating the corresponding priority weight and the corresponding random weight such that the priority weight occurs at most significant digits of the overall weight and the random weight occurs at least significant digits of the overall weight; and
use a tree of selectors to determine an overall winning candidate to be allocated with one or more hardware resource components, a respective selector of the tree of selectors selecting a winning candidate of a plurality of evaluated candidates by:
if a single evaluated candidate has a greatest priority weight, selecting the single evaluated candidate as the winning candidate, and
if at least two evaluated candidates have a greatest priority weight, selecting the evaluated candidate of the at least two evaluated candidates that has a greatest random weight as the winning candidate.

2. The networking device of claim 1, wherein the tree comprises a binary tree.

3. The networking device of claim 1, wherein the tree of selectors comprise a plurality of comparators, each comparator selecting its winning candidate by determining which evaluated candidate has a greatest overall weight.

4. The networking device of claim 1, wherein the candidates comprise candidate routes among the communication ports.

5. The networking device of claim 1, wherein the candidates comprise candidate packets in the packet queues.

6. The networking device of claim 1, wherein the arbiter circuit assigns the random weights to the plurality of candidates according to a uniform distribution.

7. The networking device of claim 1, wherein the arbiter circuit assigns a corresponding random weight from a distribution selected according to the corresponding candidate.

8. The networking device of claim 1, wherein the respective selector selects a random winning candidate if multiple candidates have equal and greatest priority weights and equal and greatest random weights.

9. A method, comprising:
assigning, by an arbiter circuit within a networking device, a respective candidate of a plurality of candidates a corresponding priority weight, the networking device comprising a plurality of hardware resource components comprising communication ports and packet queues;
assigning the respective candidate a corresponding random weight;
generate a corresponding overall weight for the respective candidate by concatenating the corresponding priority weight and the corresponding random weight such that the priority weight occurs at most significant digits of the overall weight and the random weight occurs at least significant digits of the overall weight;
determining an overall winning candidate to be allocated with one or more hardware resource components using a binary tree of comparators, a respective comparator of the binary tree of comparators comparing a pair of candidates and selecting a winning candidate based on a comparison of the overall weights of each of the pair of candidates.

10. The method of claim 9, further comprising assigning priority weights for the plurality of candidates based on a prioritization of the candidates.

11. The method of claim 9, further comprising selecting the winning candidate randomly if the overall weights of each of the pair of candidates are equal.

12. The method of claim 9, further comprising assigning a first random weight to a first candidate from a first distribution, and assigning a second random weight to a second candidate from a second distribution.

13. The method of claim 9, further comprising assigning random weights to the plurality of candidates using a deterministic random number generator or a nondeterministic random number generator.

14. The method of claim 9, wherein the candidates are candidate routes among the communication ports for a packet, and wherein the method further comprises transmitting the packet on a communication port corresponding to the overall winning candidate route.

15. The method of claim 9, wherein the candidates comprise candidate packets in the packet queues, and wherein the method further comprises transmitting the overall winning candidate packet.

16. A non-transitory computer readable medium storing a design for a networking device comprising a plurality of hardware resource components comprising communication ports and packet queues and an arbiter circuit, the arbiter circuit is to:
assign a respective candidate of a plurality of candidates a corresponding priority weight;
the respective candidate a corresponding random weight;
generate an overall weight for the respective candidate by concatenating the corresponding priority weight and the corresponding random weight such that the priority weight occurs at most significant digits of the overall weight and the random weight occurs at least significant digits of the overall weight; and
use a tree of selectors to determine an overall winning candidate to be allocated with one or more hardware resource components, a respective selector of the tree of selectors selecting a winning candidate of a plurality of evaluated candidates by:
if a single evaluated candidate has a greatest priority weight, selecting the single evaluated candidate as the winning candidate, and
if at least two evaluated candidates have a greatest priority weight, selecting the evaluated candidate of the at least two evaluated candidates that has a greatest random weight as the winning candidate.

17. The non-transitory computer readable medium of claim 16 wherein the tree of selectors comprise a plurality of comparators, each comparator selecting its winning candidate by determining which evaluated candidate has a greatest overall weight.

* * * * *